United States Patent [19]
Tchertkov et al.

[11] Patent Number: 5,936,400
[45] Date of Patent: Aug. 10, 1999

[54] MAGNETORESISTIVE DISPLACEMENT SENSOR AND VARIABLE RESISTOR USING A MOVING DOMAIN WALL

[75] Inventors: Igor Tchertkov, Sharon; Jon Klinkhamer, Rehoboth, both of Mass.

[73] Assignee: Federal Products Co., Providence, R.I.

[21] Appl. No.: 08/772,723

[22] Filed: Dec. 23, 1996

[51] Int. Cl.[6] .............. G01B 7/00; G01R 33/02; H01L 43/00; H01L 43/08
[52] U.S. Cl. .............. 324/207.21; 324/207.25; 324/207.24; 338/32 R
[58] Field of Search .............. 324/207.21, 207.22, 324/207.24, 207.25, 252; 338/32 R; 323/368

[56] References Cited

U.S. PATENT DOCUMENTS

| | | | |
|---|---|---|---|
| 4,075,671 | 2/1978 | Cheatham et al. | 360/113 |
| 4,361,805 | 11/1982 | Narimatsu et al. | 324/207 |
| 4,464,625 | 8/1984 | Lienhard et al. | 324/117 R |
| 4,525,668 | 6/1985 | Lienhard et al. | 324/142 |
| 4,596,950 | 6/1986 | Lienhard et al. | 324/117 R |
| 4,951,048 | 8/1990 | Ichikawa et al. | 341/15 |
| 5,036,275 | 7/1991 | Munch et al. | 324/207.17 |
| 5,216,363 | 6/1993 | Masaaki | 324/207.21 |
| 5,216,364 | 6/1993 | Ko et al. | 324/207.24 |
| 5,243,280 | 9/1993 | Kusumi | 324/207.21 |
| 5,313,186 | 5/1994 | Schuhl et al. | 338/32 R |
| 5,341,118 | 8/1994 | Parkin et al. | 338/32 R |
| 5,430,374 | 7/1995 | Metz | 324/207.21 |
| 5,430,375 | 7/1995 | Inoue et al. | 324/207.21 |
| 5,475,304 | 12/1995 | Prinz et al. | 324/207.21 |
| 5,477,143 | 12/1995 | Wu | 324/207.21 |
| 5,500,590 | 3/1996 | Pant | 324/252 |

OTHER PUBLICATIONS

John C. Mallinson, *Magneto–Resistive Heads Fundamentals and Applications* 94–102 (1996).

*Primary Examiner*—Walter E. Snow
*Attorney, Agent, or Firm*—Morse & Altman

[57] ABSTRACT

The displacement sensor employing a magnetoresistive effect laminate structure consisting of a bottom ferromagnetic layer with a field oriented in one direction, a middle non-magnetic layer, and a top softer magnetic layer. The top softer magnetic layer has two regions of opposing magnetic fields separated by a domain wall, where the magnetic field in one region is aligned with the bottom layer magnetic field. The resistance of the laminate structure changes as the location of the domain wall changes. In one improvement, the domain wall is induced by a pair of opposing semicylindrical magnets magnetized along their semicylindrical surface, forming parallel field lines and leading to a stronger domain wall. In another improvement, there are four laminate structures in an electrical bridge configuration. The bridge is excited by an alternating current source and the output is synchronously measured. The laminate structures are arranged in either a stack or such that pairs of laminate structures are deposited on opposite sides of a common substrate.

30 Claims, 6 Drawing Sheets

MAGNETORESISTIVE DISPLACEMENT SENSOR AND VARIABLE RESISTOR USING A MOVING DOMAIN WALL

BACKGROUND OF THE INVENTION

1. Field of the Invention

The present invention relates to displacement sensors, more specifically, to displacement sensors employing the phenomenon of giant magnetoresistance.

2. The Prior Art

Linear and angular displacement sensors are used for high-precision machining and measuring, for manufacturing and testing components with very tight dimensional tolerances. These devices are typically coupled to lathes, presses, robot arms, etc.

There are several types of displacement sensors in current use. One type of sensor measures the inductance of a metal bar passing through a wire coil. The drawbacks of this type of sensor include limited precision, large size, lack of portability, sensitivity to vibrations, expense of fabrication, and the need for large amounts of power to operate.

A second type of sensor is based on the magnetoresistive effect. Essentially, the electrical resistance of some materials is affected by the strength of local magnetic fields. This type of sensor uses the distance between a magnet and a strip of these magnetoresistive materials to measure distance. The main drawback of this type of sensor is that the change in resistance due to a change in the magnetic field strength is very small relative to the overall resistance of the element. Thus, small differences are difficult to detect and can be affected by other environmental conditions such as temperature and humidity.

A third type of sensor is described in U.S. Pat. No. 5,475,304, issued on Dec. 12, 1995 to Prinz, Hubbard, and Parsons, and entitled MAGNETORESISTIVE LINEAR DISPLACEMENT SENSOR, ANGULAR DISPLACEMENT SENSOR, AND VARIABLE RESISTOR USING A MOVING DOMAIN WALL. This patent discloses a sensor with a single element operating under the giant magnetoresistive (GMR) effect, as described below, and a means for inducing a magnetic domain wall in the element. The sensor of Prinz et al. measures the change in resistance of a single element due to a change in location of the domain wall. This sensor is an improvement over the above-described sensors of the prior art, but still has drawbacks, including a sensitivity to environmental conditions, such as temperature and humidity, and a sensitivity to "snagging", as described below.

SUMMARY OF THE INVENTION

A principle object of the present invention is to provide a linear and angular GMR effect sensor that overcomes the drawbacks of the prior art, namely to be much less sensitive to environmental conditions and snagging.

The sensor of the present invention employs four giant magnetoresistive effect laminate structures, or "strips", configured as a bridge. Each strip consists of at least three layers: a bottom ferromagnetic layer with a field oriented in one direction, a middle non-magnetic layer, and a top softer magnetic layer. The top softer magnetic layer has two regions of opposing magnetic fields separated by a domain wall, where the magnetic field in one region is aligned with the magnetic field of the bottom ferromagnetic layer. Optionally, the top and bottom layers are reversed. Optionally, an antiferromagnetic pinning layer fixes the magnetic state of the ferromagnetic layer. Optionally, a thin film of a high efficiency scattering element is provided to increase scattering efficiency. Optionally, there are a plurality of each layer type, where the ferromagnetic layers alternate with the softer magnetic layers and all of the magnetic layers are separated by a non-magnetic layers. Preferably, the strip is formed on an inert substrate.

The resistance of the strip changes as the location of the domain wall changes. In one aspect of the present invention, the domain wall is induced by a pair of opposing semicylindrical magnets that are magnetized along their circular surface. The magnetic field lines of these semicylindrical magnets are essentially parallel in the rectangular space bounded by the rectangular faces of the magnets. This is in contrast to the curved field lines produced by the indexing magnets of Prinz et al. The greater parallelism of the field lines produces a steeper gradient in the region where the magnetization changes direction, leading to a stronger domain wall, which reduces the effects of snagging.

In another aspect of the present invention, the single strip of Prinz et al. is replaced by four strips in a Wheatstone bridge configuration. A bridge provides a four-fold increase in sensitivity over a single strip. Also, a bridge is relatively insensitive to changes in the environment because it measures differences in resistance, rather than absolute resistance, so environmental changes are canceled out.

The bridge is preferably excited by an alternating current source and the output is synchronously measured. The use of an AC source increases the accuracy of the measurement because of its relatively high signal-to-noise ratio after the signal is amplified.

There are two preferred physical arrangements, called assemblages, of the four strips. In the most preferred, the strips are stacked, preferably ordered so that the direction of orientation of the harder magnetic layers of the strips alternate. In the other preferred arrangement, two strips are deposited on one side of a common substrate and the other two strips are deposited on the opposite side of the same substrate. Preferably, the harder magnetic layer of the strips on one side of the substrate are oriented in the same direction and opposite that of the strips on the other side of the substrate.

It is preferable that the domain walls of all four strips be as closely matched as possible so that the change in resistance and the inherent hysteresis of each strip is as closely matched as possible. The semicylindrical magnets produce a magnetic field in which all the field lines within the rectangular space bounded by the rectangular faces are substantially equal. Preferably, all the strips fall within this space, so that equal domain walls are induced.

In order to measure a displacement between two workpieces, the assemblage is affixed to one workpiece and the magnets are affixed to the other work piece. After the workpieces are in their proper relative position for measurement, the bridge is excited and the resulting difference voltage is measured. The measured difference voltage is a function of the relative positions of the two workpieces causing a change in the resistance of the strips.

Other objects of the present invention will become apparent in light of the following drawings and detailed description of the invention.

BRIEF DESCRIPTION OF THE DRAWINGS

For a fuller understanding of the nature and object of the present invention, reference is made to the accompanying drawings, wherein.

3

DETAILED DESCRIPTION

Giant Magnetoresistance Effect

The giant magnetoresistance (GMR) effect is a relatively newly-discovered phenomenon, whereby the electrical resistance of particular magnetic structures changes significantly (on the order of between about 8% and about 20%) in the presence of certain magnetic fields.

Figure 1:
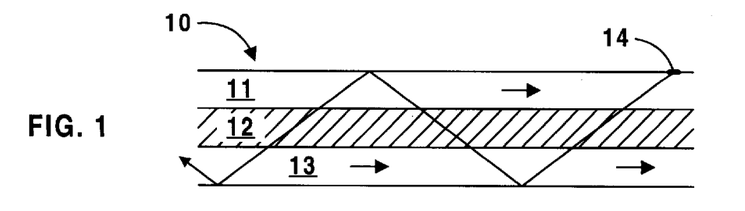
FIG. 1 is a cross-sectional view of a laminate structure having layers with aligned magnetic fields.

FIG. 1 shows a three-layer laminate structure 10 with a pair of outer ferromagnetic layers 11, 13 having aligned magnetic fields and an inner nonmagnetic conductive layer 12 in contact with both outer layers 11, 13. As carriers (generally electrons) are injected from a contact 14 into the top ferromagnetic layer 11, the carriers are spin-polarized. These spin-polarized carriers are free to travel through all three layers 11, 12, 13 of the structure 10. Consequently, the electrical resistance experienced by the current associated with the flow of these carriers is related to the thickness of the entire structure 10.

Figure 2:
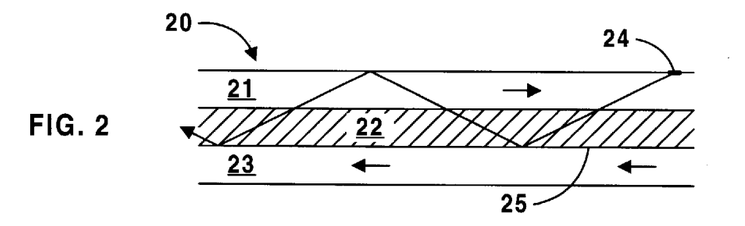
FIG. 2 is a cross-sectional view of a laminate structure having layers with opposed magnetic fields.

In contrast, FIG. 2 shows a laminate structure 20 with a pair of outer ferromagnetic layers 21, 23 having opposing magnetic fields and an inner nonmagnetic conductive layer 22 in contact with both outer layers 21, 23. As carriers are injected from a contact 24 into the top ferromagnetic layer 21, the carriers are spin-polarized. These spin-polarized carriers are free to travel through the upper ferromagnetic layer 21 and the adjacent nonmagnetic layer 22. However, in accordance with the GMR effect, when these spin-polarized carriers strike the interface 25 between the inner nonmagnetic layer 22 and the bottom ferromagnetic layer 23, the carriers are scattered back, away from the interface 25. The GMR is a function of the angle between the magnetic fields in the top and bottom layers. Scattering is minimized when the fields are parallel and is maximized when the fields are antiparallel, or opposing. Note that the magnetic fields do not have to be aligned with the longitudinal axis of the ferromagnetic layers, as long as they are opposing. For example, the GMR effect works equally well when the magnetic fields of the ferromagnetic layers are perpendicular to the longitudinal axis of the layers. When the fields are opposing, the current associated with the flow of these carriers is prevented from traveling through the entire thickness of the structure 20. Thus, the electrical resistance experienced by this current will be higher, being related only to the thickness of the top two layers 21, 22.

Figure 3:
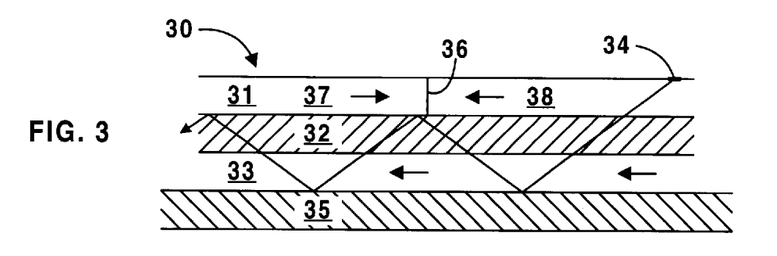
FIG. 3 is a cross-sectional view of one embodiment of a laminate structure having a domain wall in one magnetic layer separating regions of opposed magnetic fields.

An intermediate case is shown in FIG. 3. In this case, the laminate structure 30 has a bottom ferromagnetic layer 33 with a fixed magnetic state and a top softer magnetic layer 31 with regions 37, 38 of opposing magnetic fields separated by a domain wall 36. The magnetic field in the region 38 adjacent to an injection contact 34 is aligned with the magnetic field of the bottom ferromagnetic layer 33. Separating and contacting the two magnetic layers 31, 33 is a nonmagnetic conductive metal layer 32 for preventing exchange coupling between the two magnetic layers 31, 33 so that the magnetic layers 31, 32 do not affect each other. As carriers are injected from the contact 34 into the top softer magnetic layer 31, the carriers are spin-polarized. These spin-polarized carriers are free to travel through the top softer magnetic layer 31, the nonmagnetic layer 32, and the bottom ferromagnetic layer 33. Because the effective thickness of the conductor is the thickness of all three layers 31, 32, 33, electrical resistance will be relatively low on this side of the domain wall 36.

In accordance with the GMR effect, as the spin-polarized carriers travel further down the structure 30 to the other side of the domain wall 36, they are confined to the bottom two layers 32, 33. Because the effective thickness of the conductor is the thickness of only the bottom two layers 32, 33, electrical resistance will be relatively high on this side of the domain wall 36. Consequently, the overall electrical resistance of the laminate structure 30 is a linear function of the location of the domain wall 36. Positioning the domain wall 36 away from the injection contact 34 results in a relatively low electrical resistance for the structure 30, and positioning the domain wall 36 near the injection contact 34 results in a relatively high electrical resistance for the structure 30.

Note that the spin-polarized carriers travel a non-reciprocal path. If the carriers are injected from the left side of the domain wall 38, the spin-polarized carriers will be confined to the top two layers 31, 32 on the near side of the domain wall 38, but will be free to travel through the entire thickness of the laminate structure 30 on the right side of the domain wall 38. In this case, moving the domain wall 38 to the left decreases the electrical resistance, while moving it to the right increases the electrical resistance.

Figure 4:
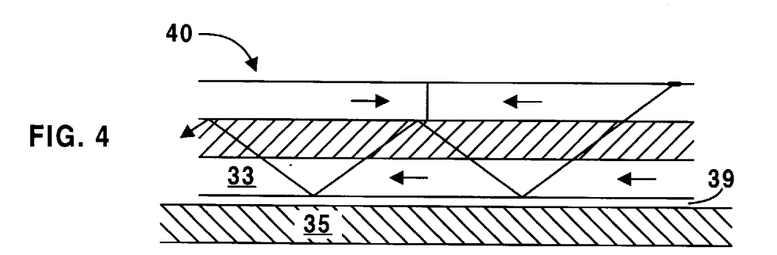
FIG. 4 is a cross-sectional view of the laminate structure of FIG. 3 having a pinning layer.

Another configuration 41 of the laminate structure of FIG. 3 is shown in FIG. 4, where an antiferromagnetic pinning layer 39 fixes the magnetic state of the bottom ferromagnetic layer 33.

Figure 5:
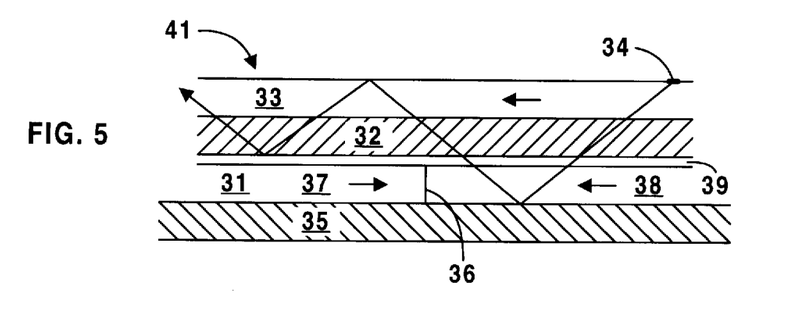
FIG. 5 is a cross-sectional view of a second embodiment of a laminate structure having a domain wall.

FIG. 5 shows another laminate structure 42 embodiment. The harder magnetic layer 33 is on top, where it spin-polarizes the injected carriers. The softer magnetic layer 31 is on the bottom and the nonmagnetic buffer layer 32 contacts with and separates the two magnetic layers 31, 33. Since the interface between the softer magnetic layer 33 and the nonmagnetic layer 32 is the scattering surface in this embodiment, a thin film 39 of a high efficiency scattering element may be provided to increase scattering efficiency.

Figure 6:
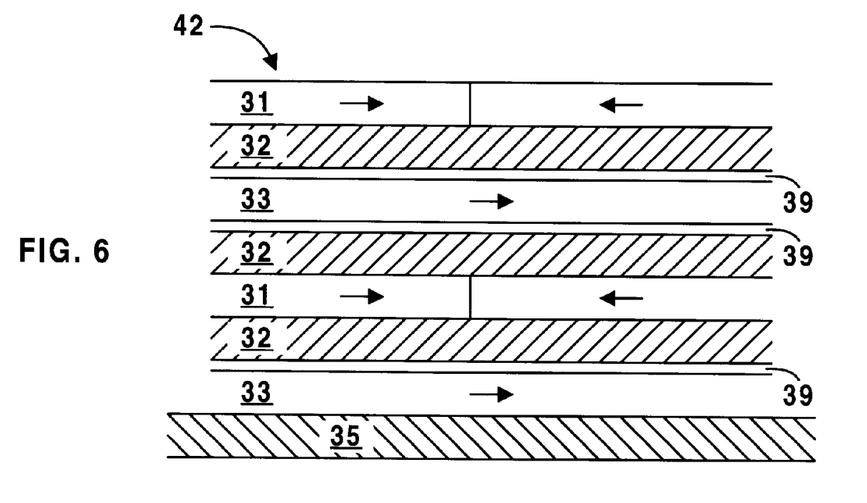
FIG. 6 is a cross-sectional view of a third embodiment of a multi-laminate structure having a domain wall.

FIG. 6 shows yet another laminate structure 43 embodiment. In this multilayered embodiment, a plurality of softer magnetic layers 31 and a plurality of harder magnetic layers 33 alternate, with the magnetic layers 31, 33 being separated by and in contact with nonmagnetic buffer layers 32. The harder magnetic layers 33 are sandwiched by scattering elements 39. This multilayered embodiment provides enhanced dynamic range for the sensor, up to the limit of the thickness 38 being less than or equal to the spin relaxation distance.

Preferred materials for the harder magnetic layer include hard ferromagnetic materials (e.g., cobalt, iron, and alloys thereof) and antiferromagnetically-pinned materials. In a sense, antiferromagnetic materials are the hardest magnetic materials, because their net magnetic fields are completely insensitive to external magnetic fields. Consequently, use of an antiferromagnetic layer to pin the harder magnetic layer permits the use of a relatively hard magnetic material (e.g., iron) for the softer magnetic layer. Suitable antiferromagnetic materials for pinning include FeMn and rare earth alloys (e.g., TbFe). In a typical embodiment of the invention, the layer (which may be ferromagnetic or antiferromagnetic) having a fixed magnetic state comprises an antiferromagnetic material coated with a thin film of a ferromagnetic metal.

Many ferromagnetic materials have poor scattering efficiency, which results in poor magnetic polarization. Preferably, as shown in FIGS. 5 and 6, the interfacial regions of the harder magnetic layer 33 will include a thin coating 39 (1 to 5 atoms thickness is sufficient) of a strong scattering element, such as iron, to enhance magnetic polarization. Preferably, the harder magnetic layer is between about 5 nanometers (nm) and about 100 nm thick. Other exemplary magnetically hard materials are described in U.S. Pat. No. 4,402,770 by Koon.

Preferred materials for the softer magnetic layer include nickel, iron, permalloy, cobalt, and combinations thereof (such as alloys and multilayer sandwiches). Generally speaking, in magnetically hostile environments it is preferable to use a relatively hard magnetic material for this layer in order to avoid interference problems. In environments that are not magnetically hostile it is preferable to use a magnetic material in which it is easy to establish a well-defined domain wall. Preferably, the softer magnetic layer is between about 5 nm and about 100 nm thick. Other exemplary magnetically soft materials are described in U.S. Pat. No. 4,409,043 by Koon.

Preferred materials for the nonmagnetic buffer layer include copper, platinum, silver, gold, and combinations thereof. Preferably, the nonmagnetic buffer layer is between about 5 nm and about 100 nm thick.

When used in an instrument, the laminate structure is preferably formed on an inert substrate 35, shown in FIGS. 3–6. The preferred material for the substrate 35 is silicon. Each laminate structure layer is deposited by whichever method is most practical for the particular material being used. There are many deposition methods well-known in the art.

The dimensions of the laminate structure depend upon the use to which it is being put. The narrower laminate structure is, the greater the resistance per unit length. Consequently, the preferred laminate structure is made relatively narrow in order to obtain greater changes in resistance as the domain wall 36 moves. However, if the laminate structure is so narrow that electrical connections cannot be easily made to it, large pads are preferably formed at the ends.

Inducing the Domain Wall

Skilled practitioners know that there are a number of methods available for inducing a domain wall in a laminate structure 30 (hereinafter, a "strip"). In selecting a particular method, skilled practitioners, by following known principles of ferromagnetism, will consider maximizing domain wall definition or sharpness. Domain wall sharpness describes the strength of the domain wall 36, which is determined by the gradient of the magnetic field between the regions of opposed magnetic fields 37, 38 on either side of the domain wall 36.

One consideration when determining what method to use to induce a domain wall is an effect called "snagging". The layers deposited to form the strip 30 have various imperfections, including rough edges, uneven thickness', surface pits, and chemical impurities. These imperfections cause localized irregularities in the magnetic field. As the domain wall 36 moves along the length of the strip 30, it must overcome these magnetic field irregularities. Consequently, because it is "snagged" by these irregularities, the domain wall 36 does not move smoothly, but jumps as it overcomes the irregularities. The strength of the domain wall 36 determines how smoothly it moves because a stronger domain wall 36 will overcome weaker irregularities. Since the smoothness with which the domain wall 36 moves determines the precision to which it can be located, the stronger the domain wall 36 is, the greater the precision to which its location can be determined.

Another parameter of the domain wall 36 that is related to the sharpness is hysteresis. Minimizing hysteresis in the domain wall 36 improves two-way precision.

Figure 7:
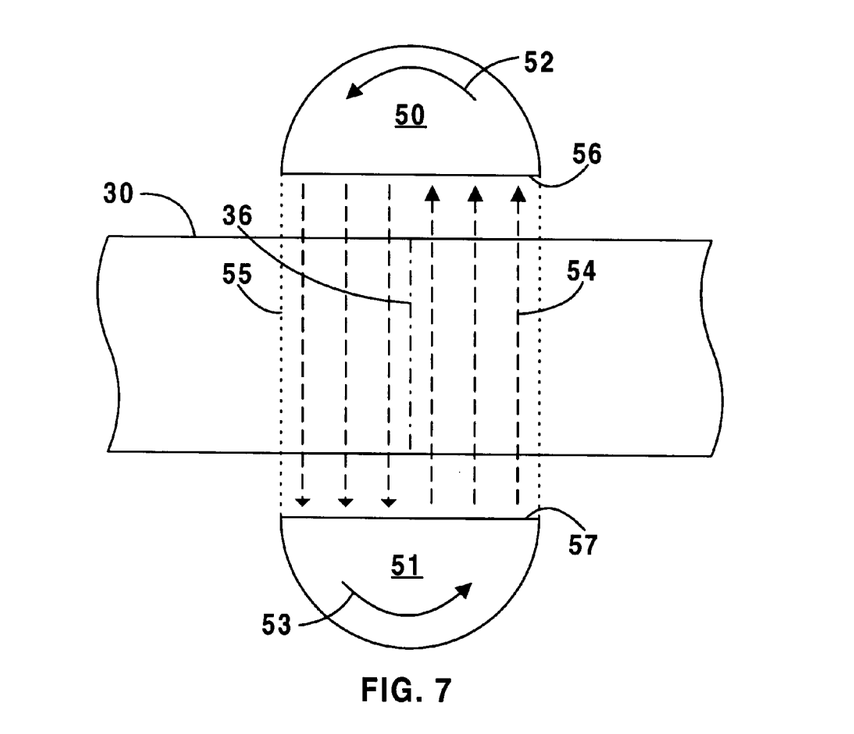
FIG. 7 is a top view of a configuration for inducing a domain wall.

As shown in FIG. 7, a pair of indexing magnets 50, 51 with preferably opposing magnetic fields 52, 53 are positioned to induce a domain wall 36 in the softer magnetic layer 31. This positioning for the indexing magnets 50, 51 is particularly preferred, because it provides a relatively steep magnetic gradient between the magnetic field lines 54. The steeper the magnetic gradient, the more well-defined and stronger the domain wall 36 is.

In Prinz et al., the domain wall is induced by a pair of wedge-shaped magnets with opposing magnetic fields that are positioned on opposite sides of the strip. In the present invention, it has been discovered that the semicylindrical magnets 50, 51 of FIG. 7 magnetized along their circular outer surface, as at 52, 53, induce a very well-defined domain wall 36 while minimizing hysteresis. The magnetic field lines 54 of the semicylindrical magnets are essentially parallel in the rectangular space 55 bounded by the rectangular faces 56, 57 of the magnets 50, 51. This is in contrast to the outwardly curved field lines produced by the wedge-shaped indexing magnets preferred by Prinz et al. The greater parallelism of the field lines 54 produces a steeper gradient in the region where the magnetization changes direction, leading to a stronger domain wall 36.

An additional advantage of a steeper gradient is that hysteresis is minimized by an order of magnitude over that of Prinz et al.

Measuring the Resistance of a Strip

Figure 8:
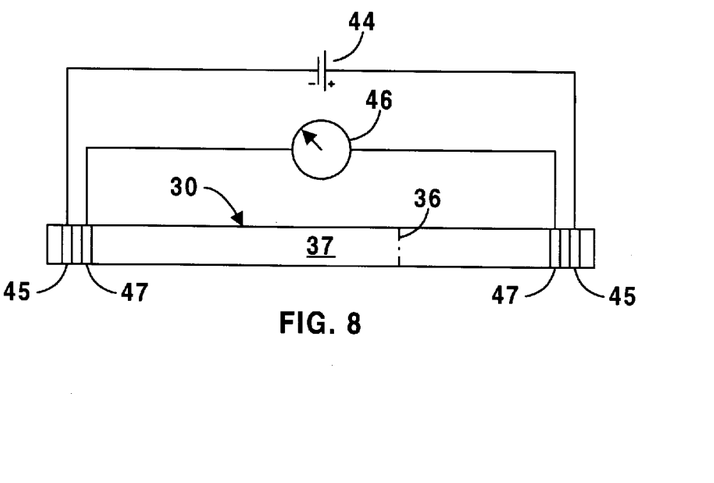
FIG. 8 is a diagram of how resistance is measured in the laminate structure of the present invention.

FIG. 8 shows a standard four-probe configuration for measuring the resistance of a strip 30. A current source 44 excites the strip through contacts 45 near the ends of the softer magnetic layer 31 on either side of the domain wall 36. A voltage measuring instrument 46 detects the voltage developed across the strip 30 through contacts 47 also near the ends of the softer magnetic layer 31 on either side of the domain wall 36, and the resistance of the strip 30 is calculated. The position of the domain wall 36 between the voltage measuring contacts 47 determines the resistance of the strip 30.

Bridge Structure

In the disclosure of Prinz et al., the electrical resistance of a strip 30 is measured using a standard four-probe ohmmeter configuration in which a constant current source induces a current in the strip, a voltmeter measures the resulting voltage across the strip, and the voltage measurement is converted into resistance.

Figure 9:
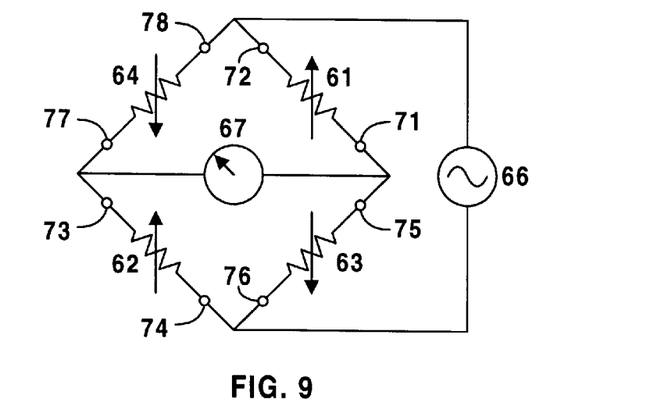
FIG. 9 is an electrical schematic of a preferred embodiment of the present invention.

In the present invention, the single strip of Prinz et al. is replaced by four strips 61–64 in a Wheatstone bridge configuration, shown schematically in FIG. 9. Each strip 61–64 has the same composition as the laminate structure described above. Preferably, all four strips 61–64 have substantially the same dimensions so that they react in the substantially same manner to the same magnetic field.

The strips 61–64 are electrically connected so that the strips 61, 62 on opposed legs increase resistance at the same time that the strips 63, 64 on the other opposed legs decrease resistance. This is shown by the arrows through the resistors of FIG. 9.

One advantage to using a bridge of strips over a single strip is that the bridge provides a four-fold increase in sensitivity over the single strip. It is well known in the electrical measurement art that bridges are much more accurate for measuring resistance than other measurement methods, such as the two-wire and four wire methods contemplated by Prinz et al.

A second advantage is the relative insensitivity to changes in the environment, such as changes in temperature and humidity. Both temperature and humidity have an effect on the resistance of an electrical conductor. As the environment changes, so too does the resistance of the conductor. Preferably, the four strips are formed simultaneously on a single substrate from the same materials. As a result, the environment will effect all four strips in substantially the same manner and by substantially the same amount. For example, if the change in resistance due to change in temperature of one strip 61 is 900 ppm/° C., then the other three strips 62–64 will have a temperature sensitivity that is almost identical. By itself, this characteristic does not improve accuracy. However, a bridge measures a voltage difference induced by the difference in resistance between two pairs of resistive elements; it does not measure the absolute resistance of one resistive element. Therefore, in a bridge configuration, the changes in resistance due to the environment cancel each other out.

In the present invention, the bridge is preferably excited by an alternating current (AC) source 66 rather than a direct current (DC) source. An AC source, when used with a synchronous measurement instrument 67, is preferred because the signal to be measured must be amplified and, as is well known in the art, the signal-to-noise ratio of an amplified AC signal is much higher than that of a DC signal. Consequently, the use of an AC source increases the accuracy of the measurement.

Figure 10:
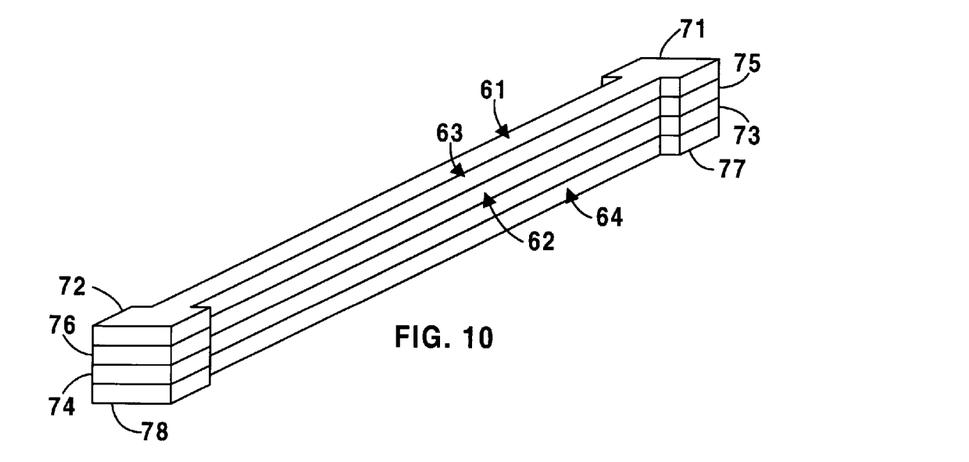
FIG. 10 is a perspective view, partially in phantom, of a preferred assemblage of the present invention.

The four strips 61–64 are physically arranged in an assemblage, of which there are two preferred embodiments, one of which is most preferred. In the most preferred embodiment, an example of which is shown in FIG. 10, the four strips 61–64 are arranged in a stack to form the assemblage 60. Initially, the strips 61–64 of the same size are deposited at the same time on a single substrate. After depositing, the substrate is sliced to separate the four strips 61–64, which are then are adhered together in a stack arrangement, with the substrates separating them. In this stack arrangement, the pads 71–78 at opposite ends of the strips 61–64 are aligned.

The present invention contemplates that the strips 61–64 in the stack assemblage 60 may be stacked in any order. However, the preferred order providing the most accurate measurement occurs when the strips 61–64 are ordered so that the direction of orientation of the harder magnetic layers 33 of the strips alternate. In other words, as the domain wall 36 moves, if the resistance of the top strip increases, the resistance of the second strip decreases, the third strip increases, and the bottom strip decreases. There are a number of strip orderings that meet this criteria. For example, FIG. 10 shows one preferred order in which the strips are stacked, where from top to bottom the order is 61–63–62–64. From the arrows in the schematic of FIG. 9, it can be seen that as the top strip 61 and the third strip 62 increase resistance, the second strip 63 and the bottom strip 64 decrease resistance.

Figure 11:
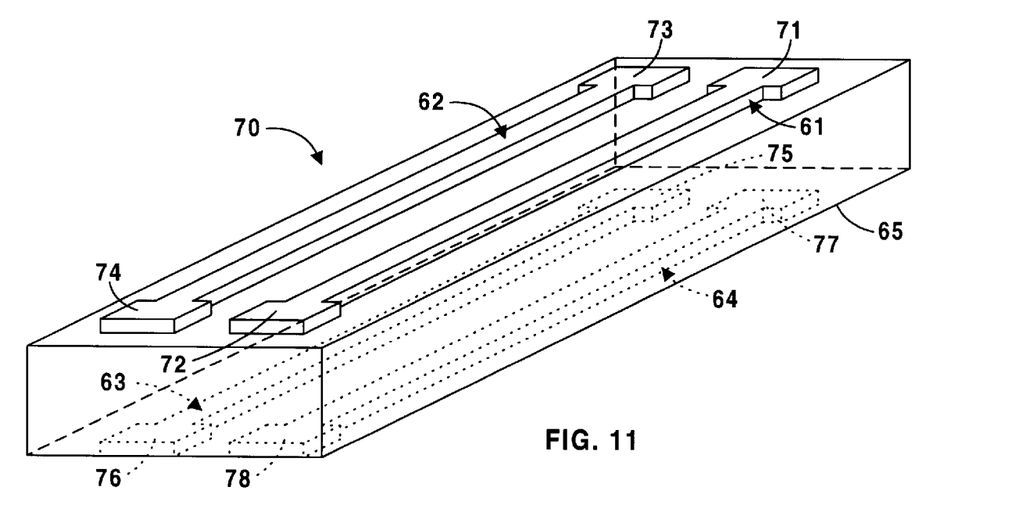
FIG. 11 is a perspective view, partially in phantom, of another preferred assemblage of the present invention.

In the second preferred embodiment of the assemblage, an example of which is shown in FIG. 11, two strips 61, 62 are deposited on one side of a common substrate 65 and the other two strips 63, 64 are deposited on the opposite side of the same substrate 65, thereby forming an assemblage 70. Preferably, the strips 61, 62 on the same side of the substrate 65 are separated by the same distance as the strips 63, 64 on the other side of the substrate 65, and that strips on the opposite side of the substrate 65 are aligned. In other words, the preferred locations of the strips form a rectangular parallelepiped with the eight pads 71–78 at the eight corners. The reason for this preferred arrangement is described below with reference to the magnetic field inducing the domain walls 36.

The present invention contemplates that each strip 61–64 in the rectangular assemblage 70 may be located in any of the four positions on the substrate 65. However, the preferred order providing the most accurate measurement occurs when the harder magnetic layer of the strips 61, 62 on one side of the substrate 65 are oriented in the same direction and opposite that of the strips 63, 64 on the other side of the substrate 65. The result is that, when the domain wall 36 changes position so as to increase the resistance of strips 61, 62 of one side, the resistance of strips 63, 64 of the other side decreases, as shown by the arrows through the resistors 61–64 in FIG. 10.

It is preferable that the domain walls 36 of all four strips be as closely matched as possible so that the change in resistance and the inherent hysteresis of each strip 61–64 is as closely matched as possible. To ensure substantially matched domain walls 36, the strips 61–64 must be subjected to substantially equal magnetic fields at the location where the domain wall 36 is to be produced.

The semicylindrical magnets 50, 51 described above produce a magnetic field in which all the field lines within the rectangular space 55 bounded by the rectangular faces 56, 57 of the magnets 50, 51 are substantially equal. The strength of each field line 54 decreases as the distance from each face 56, 57 increases. The center of the field line is not necessarily the point of the weakest field; that point depends upon the relative strengths of the two indexing magnets 50, 51.

Figure 12:
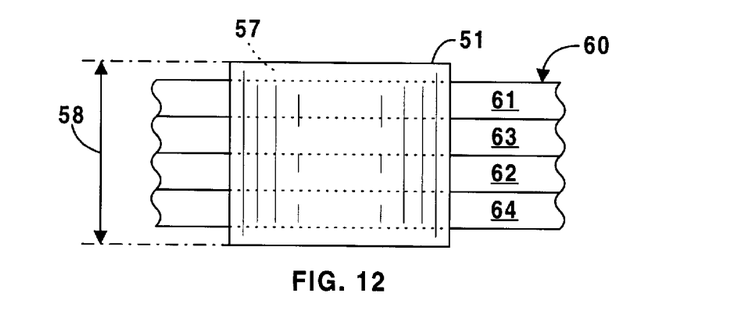
FIG. 12 is a side view of a section of the assemblage of FIG. 10 showing magnets inducing a domain wall.

To ensure that all of the strips 61–64 are subjected to substantially equivalent magnetic fields, it is preferable that the height 58 of the magnets 50, 51 be at least that of the assemblage 60, 70 and located so that the strips 61–64 all fall within the rectangular space 55 defined by the magnet faces 56, 57, as illustrated in FIG. 12. If the magnets 50, 51 do not have this minimum height 58 or the strips 61–64 are not all located within the rectangular space 55, the domain walls 36 in each strip 61–64 will be induced by areas of the magnetic field with different strengths, leading to domain walls 36 with different strengths, and resulting in less accurate measurements.

It is possible to use magnets having less than the above-described minimum height with the rectangular assemblage 70. However, the magnets must be vertically centered with respect to the assemblage 70. This arrangement is not preferred because of the difficulty in accurately maintaining the relative positions between the assemblage 70 and the magnets as close as is necessary for accurate measurements. This arrangement is not available with the stack assemblage 60 because there is no vertical point in the assemblage 60 from which all the strips are equidistant.

The horizontal position of the stack assemblage 60 between the magnet faces 56, 57 is not critical because all of the strips 61–64 will be subjected to the same field strength regardless of horizontal position. However, the horizontal position of the rectangular assemblage 70 is critical. The fact that the strips on the same side of the substrate are horizontally spaced from each other means that the assemblage 70 must be centered about the point of the weakest magnetic field. What makes this more difficult is that, as noted above, the weakest magnetic field point depends upon the relative strengths of the indexing magnets 50, 51. Thus, in order for measurements to be consistent from one instrument to another, the indexing magnets 50, 51 must be matched so that the weakest field point is at the same location in all instruments.

Measuring Instruments

Figure 13:
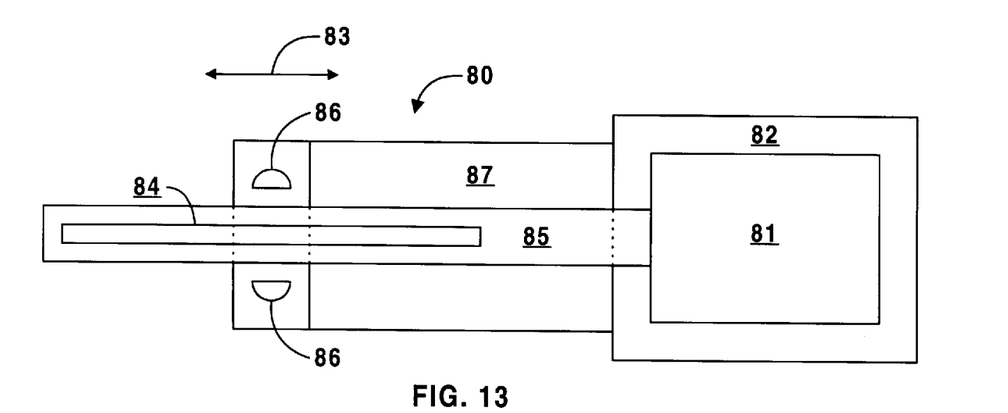
FIG. 13 is a top view of a linear displacement measurement instrument employing the present invention.
Figure 14:
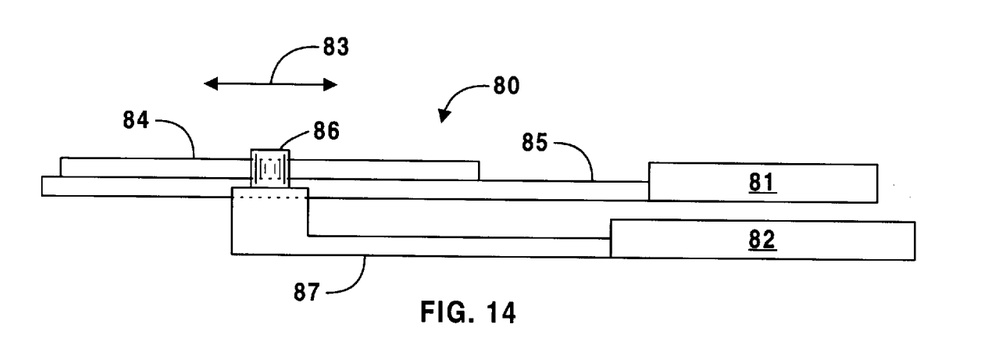
FIG. 14 is a side view of the instrument of FIG. 13.

A basic linear measuring instrument 80 embodying the magnetoresistive displacement sensor of the present invention is shown in FIGS. 13 and 14. It is used to measure the relative position of two workpieces 81, 82 that are limited to linear movement, as at 83, with respect to each other. The assemblage 84 is attached to an instrument body 85 and the indexing magnets 86 are attached to a frame 87 so that the magnets 86 straddle the assemblage 84. The assemblage 84 may be any one of the assemblages described above, including any of the single strips 30, 40, 41, 42, the stack assemblage 60, or the rectangular assemblage 70. In the preferred embodiment, the assemblage body 85 is fixed, while the magnet frame 87 moves with respect to the body 85. The reason is that the stationary excitation and measuring instruments are attached to the assemblage 84 on the body 85 via electrical wires, and the frame 87, because the indexing magnets 86 are self-contained, is completely independent of external devices. Consequently, when the body 85 is fixed, it does not move relative to the excitation and measuring instruments, and there is a significantly lesser chance that there will be a failure due to the breakage of an electrical connection.

After the workpieces 81, 82 are in their proper relative position for measurement, the assemblage 84 is excited and the resulting voltage across the assemblage 84 is measured. The voltage is a function of the relative positions of the two workpieces 81, 82.

Figure 15:
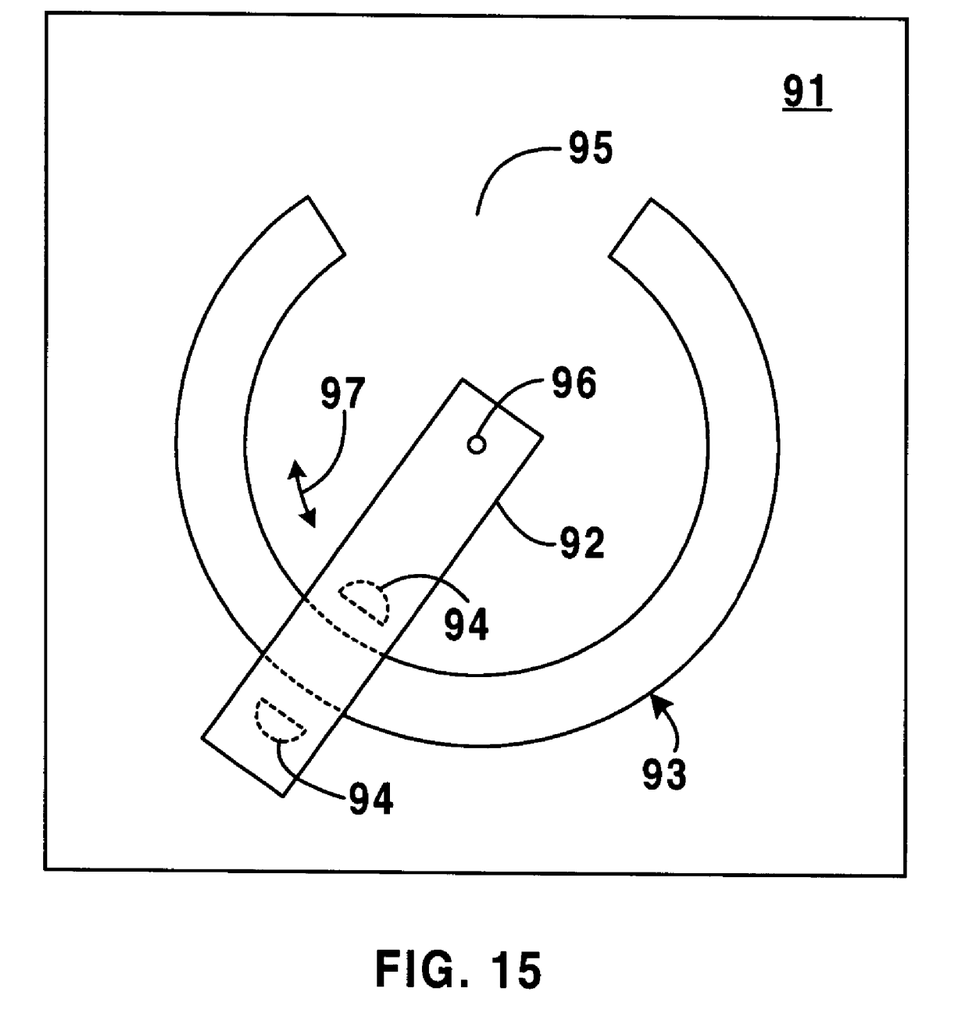
FIG. 15 is a top view of an angular displacement measurement instrument employing the present invention.

FIG. 15 shows the top of an embodiment of the present invention that operates as an angular displacement sensor 90. The assemblage 93 is attached to a fixed workpiece 91. As with the linear instrument, the assemblage 93 may be any of the preferred assemblages described above, including any of the single strips 30, 40, 41, 42, the stack assemblage 60, or the rectangular assemblage 70. The assemblage 93 is formed into an essentially circular member with a gap 95 at which the electrical connections to the measurement instruments are made. The center 96 of the assemblage 93 is substantially on the axis of rotation. The indexing magnets 94 are coupled to the workpiece 92 that is rotatably mounted for moving about the axis of rotation, as at 97. The magnets 94 extend downwardly from the rotating workpiece 92 to straddle the assemblage 93. The position of the induced domain wall follows the angular displacement of the rotating workpiece 92.

Thus it has been shown and described a displacement sensor which satisfies the objects set forth above.

Since certain changes may be made in the present disclosure without departing from the scope of the present invention, it is intended that all matter described in the foregoing specification and shown in the accompanying drawings be interpreted as illustrative and not in a limiting sense.

What is claimed is:

1. A sensor for measuring a displacement between a first workpiece and a second workpiece, said sensor comprising:
   (a) an assemblage affixed to said first workpiece, said assemblage including a giant magnetoresistive strip having an electrical resistance, said strip including at least one laminate structure, said laminate structure including a first magnetic layer comprised of a ferromagnetic or antiferromagnetically-pinned material and having a magnetic field orientation, a second magnetic layer comprised of a material that is magnetically softer than said first layer, and a conductive layer interposed between and contacting said first layer and said second layer, said conductive layer preventing substantially all exchange coupling between said first layer and said second layer;
   (b) two indexing magnets affixed to said second workpiece, said magnets inducing a domain wall at a position between regions of mutually unaligned magnetic fields in said second layer of said strip, each of said magnets having a semicylindrical outer surface, a rectangular face, and a magnetic field aligned with said semicylindrical outer surface, said magnets being disposed on opposite sides of said strip with said rectangular surfaces facing each other, and said magnets having substantially opposing magnetic moments substantially perpendicular to said domain wall; and
   (c) a measuring means for measuring the electrical resistance of said strip, thereby determining said position of said domain wall, thereby measuring said displacement between said first workpiece and said second workpiece.

2. The sensor of claim 1 wherein said measuring means includes a means for injecting a current into said strip and a means for measuring a voltage across said strip.

3. The sensor of claim 1 wherein said first magnetic layer is comprised substantially of a material selected from the group consisting of chromium, cobalt, iron, nickel, manganese, and alloys thereof.

4. The sensor of claim 1 wherein said first magnetic layer is comprised of an antiferromagnetic metal coated with a thin film of ferromagnetic metal.

5. The sensor of claim 1 wherein said second magnetic layer is comprised substantially of a material selected from the group consisting of cobalt, iron, nickel, manganese, and alloys thereof.

6. The sensor of claim 1 wherein said sensor is a linear displacement sensor and said strip forms an essentially straight member.

7. The sensor of claim 1 wherein said sensor is an angular displacement sensor for measuring the rotational displacement of said second workpiece relative to said first workpiece, said second workpiece being mounted to rotate about an axis of rotation relative to said first workpiece, said strip forming a substantially arcuate member having a center essentially on said axis of rotation, and said domain walls being substantially radial to said arcuate member.

8. A sensor for measuring a displacement between a first workpiece and a second workpiece, said sensor comprising:

(a) an assemblage affixed to said first workpiece, said assemblage including an electrical bridge, said bridge having four legs, each of said four legs including a giant magnetoresistive strip having an electrical resistance;

(b) said strip including at least one laminate structure, said laminate structure including a first magnetic layer comprised of a ferromagnetic or antiferromagnetically-pinned material and having a magnetic field orientation, a second magnetic layer comprised of a material that is magnetically softer than said first layer, and a conductive layer interposed between and contacting said first layer and said second layer, said conductive layer preventing substantially all exchange coupling between said first layer and said second layer;

(c) said strip having a longitudinal axis, said longitudinal axes of all four of said strips being substantially parallel to each other;

(d) an inducing means affixed to said second workpiece, said inducing means inducing a domain wall at a position between regions of mutually unaligned magnetic fields in said second layer of all four of said strips;

(e) an excitation means for exciting said bridge; and (f) a measuring means for measuring the output of said bridge, thereby determining said position of said domain walls, thereby measuring said displacement between said first workpiece and said second workpiece.

9. The sensor of claim 8 wherein said four strips are of approximately equal length.

10. The sensor of claim 8 wherein said four strips form a stack.

11. The sensor of claim 8 wherein said four strips form a rectangle when said assemblage is viewed in cross-section.

12. The sensor of claim 8 wherein each of said strips has a current flow in a direction that is substantially perpendicular to said domain wall.

13. The sensor of claim 8 wherein said position of said domain wall is substantially the same in all four of said strips.

14. The sensor of claim 8 wherein said four domain walls are substantially equal in strength and definition.

15. The sensor of claim 8 wherein said magnetic field orientation of said first magnetic layer of said strip of one of said legs is approximately the opposite of said magnetic field orientation of said strips of the two of said legs electrically connected to said one of said legs, whereby, when a change in said position of said domain walls causes said resistance of said strips of said one of said legs to decrease, said resistance of said strips of said two legs increases.

16. The sensor of claim 8 wherein said inducing means includes at least two indexing magnets, each having a semicylindrical outer surface, a rectangular face, and a magnetic field aligned with said semicylindrical outer surface, said magnets being disposed on opposite sides of said assemblage with said rectangular surfaces facing each other, and said magnets having substantially opposing magnetic moments substantially perpendicular to all four of said domain walls.

17. The sensor of claim 8 wherein said first magnetic layer is comprised substantially of a material selected from the group consisting of chromium, cobalt, iron, nickel, manganese, and alloys thereof.

18. The sensor of claim 8 wherein said first magnetic layer is comprised of an antiferromagnetic metal coated with a thin film of ferromagnetic metal.

19. The sensor of claim 8 wherein said second magnetic layer is comprised substantially of a material selected from the group consisting of cobalt, iron, nickel, manganese, and alloys thereof.

20. The sensor of claim 8 wherein said excitation means includes an alternating current source.

21. The sensor of claim 20 wherein said measuring means includes an instrument for measuring a voltage output of said bridge, said instrument being synchronized with said current source.

22. The sensor of claim 8 wherein said sensor is a linear displacement sensor and said assemblage forms an essentially straight member.

23. The sensor of claim 8 wherein said sensor is an angular displacement sensor for measuring the rotational displacement of said second workpiece relative to said first workpiece, said second workpiece being mounted to rotate about an axis of rotation relative to said first workpiece, said assemblage forming a substantially arcuate member having a center essentially on said axis of rotation, and all four of said domain walls being substantially radial to said arcuate member.

24. A sensor for measuring a displacement between a first workpiece and a second workpiece, said sensor comprising:

(a) an assemblage affixed to said first workpiece, said assemblage including an electrical bridge, said bridge having four legs, each of said four legs including a giant magnetoresistive strip having an electrical resistance;

(b) said strip including at least one laminate structure, said laminate structure including a first magnetic layer comprised of a ferromagnetic or antiferromagnetically-pinned material and having a magnetic field orientation, a second magnetic layer comprised of a material that is magnetically softer than said first layer, and a conductive layer interposed between and contacting said first layer and said second layer, said conductive layer preventing substantially all exchange coupling between said first layer and said second layer;

(c) said magnetic field orientation of said first magnetic layer of said strip of one of said legs being approximately the opposite of said magnetic field orientation of said strips of the two of said legs electrically connected to said one of said legs, whereby, when a change in said position of said domain walls causes said resistance of said strips of said one of said legs to decrease, said resistance of said strips of said two legs increases;

(d) said strip having a longitudinal axis, said longitudinal axes of all four of said strips being parallel to each other, all four of said strips having approximately the same length, and said four strips forming a stack;

(e) an inducing means affixed to said second workpiece, said inducing means inducing a domain wall at a position between regions of mutually unaligned magnetic fields in said second layer of all four of said strips, all four of said domain walls being substantially equal in strength and definition;

(f) each of said strips having a current flow in a direction that is substantially perpendicular to said domain wall;

(g) an alternating current source for exciting said bridge; and (h) an instrument for measuring a voltage output of said bridge, thereby determining said position of said domain walls, thereby measuring said displacement between said first workpiece and said second workpiece.

25. The sensor of claim 24 wherein said inducing means includes at least two indexing magnets, each having a semicylindrical outer surface, a rectangular face, and a magnetic field aligned with said semicylindrical outer surface, said magnets being disposed on opposite sides of said assemblage with said rectangular surfaces facing each other, and said magnets having substantially opposing magnetic moments substantially perpendicular to all four of said domain walls.

26. The sensor of claim 24 wherein said first magnetic layer is comprised substantially of a material selected from the group consisting of chromium, cobalt, iron, nickel, manganese, and alloys thereof.

27. The sensor of claim 24 wherein said first magnetic layer is comprised of an antiferromagnetic metal coated with a thin film of ferromagnetic metal.

28. The sensor of claim 24 wherein said second magnetic layer is comprised substantially of a material selected from the group consisting of cobalt, iron, nickel, manganese, and alloys thereof.

29. The sensor of claim 24 wherein said sensor is a linear displacement sensor and wherein said assemblage forms an essentially straight member.

30. The sensor of claim 24 wherein said sensor is an angular displacement sensor for measuring the rotational displacement of said second workpiece relative to said first workpiece, said second workpiece being mounted to rotate about an axis of rotation relative to said first workpiece, said assemblage forms a substantially arcuate member having a center essentially on said axis of rotation, and all four of said domain walls are substantially radial to said arcuate member.

* * * * *